United States Patent
Kim

(10) Patent No.: US 9,450,219 B2
(45) Date of Patent: Sep. 20, 2016

(54) BATTERY MODULE

(75) Inventor: Myung-Chul Kim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 636 days.

(21) Appl. No.: 13/441,098

(22) Filed: Apr. 6, 2012

(65) Prior Publication Data

US 2013/0071713 A1 Mar. 21, 2013

Related U.S. Application Data

(60) Provisional application No. 61/535,001, filed on Sep. 15, 2011.

(51) Int. Cl.
  *H01M 2/10* (2006.01)
  *H01M 2/02* (2006.01)
  *B60L 11/18* (2006.01)

(52) U.S. Cl.
  CPC ......... *H01M 2/1077* (2013.01); *H01M 2/1083* (2013.01); *H01M 2/0217* (2013.01); *H01M 2/1061* (2013.01)

(58) Field of Classification Search
  CPC .. H01M 2/1077; H01M 2/206; H01M 2/105; H01M 2/12; H01M 2/0217; H01M 2/1061; H01M 2/1083; H01M 10/5004; H01M 10/5032; H01M 10/5055; H01M 10/0481; H01M 10/0525; H01M 10/5016; H01M 10/5059; H01M 10/052; H01M 10/4207; H01M 10/5006; H01M 10/5046; H01M 10/5061; H01M 10/5073; H01M 10/5083; H01M 10/5087; H01M 10/345; H01M 10/503; H01M 10/5063
  USPC .......................................................... 429/99
  See application file for complete search history.

(56) References Cited

U.S. PATENT DOCUMENTS 2,939,901 A * 6/1960 Schultz .......................... 429/100
6,197,446 B1 * 3/2001 Fukuda et al. ................. 429/163

(Continued)

FOREIGN PATENT DOCUMENTS

| CN | 1795572 A | 6/2006 |
| CN | 1972005 A | 5/2007 |

(Continued)

OTHER PUBLICATIONS

Chinese Office Action dated Oct. 9, 2015 in Corrseponding Chinese Patent Application No. 201210149060.0.

(Continued)

*Primary Examiner* — Jonathan G Leong
*Assistant Examiner* — Anne R Dixon
(74) *Attorney, Agent, or Firm* — Lee & Morse, P.C.

(57) ABSTRACT

A battery module including at least two battery cells, each battery cell including a terminal surface having a terminal therein, a back surface, and a side surface extending in a plane between the terminal surface and the back surface, the back surface of one battery cell facing the back surface of another battery cell such that the at least two battery cells have face-to-face back surfaces; a housing fixing the at least two battery cells together; and a mid-support between the at least two battery cells, the mid-support including at least one base portion in an interposed, adjoining relationship with the face-to-face back surfaces of the battery cells, and at least one flange portion extending in a plane parallel to the plane of the side surface.

16 Claims, 9 Drawing Sheets

(56) References Cited

U.S. PATENT DOCUMENTS

| | | |
|---|---|---|
| 7,858,229 B2 | 12/2010 | Shin et al. |
| 7,955,729 B2* | 6/2011 | Onuki et al. ............... 429/163 |
| 2003/0003350 A1* | 1/2003 | Heimer et al. ............... 429/99 |
| 2005/0285567 A1 | 12/2005 | Kim |
| 2006/0246348 A1 | 11/2006 | Hamada et al. |
| 2007/0190409 A1* | 8/2007 | Sakurai ..................... 429/159 |
| 2008/0090137 A1 | 4/2008 | Buck et al. |
| 2009/0017366 A1* | 1/2009 | Wood et al. ................ 429/62 |
| 2009/0155675 A1* | 6/2009 | Houchin-Miller ......... 429/120 |
| 2010/0112425 A1* | 5/2010 | Dunn .......................... 429/99 |
| 2010/0304188 A1* | 12/2010 | Larsen ........................ 429/1 |
| 2010/0316895 A1* | 12/2010 | Hedrich et al. ............. 429/83 |
| 2011/0151298 A1 | 6/2011 | Kim |
| 2012/0028099 A1 | 2/2012 | Aoki |
| 2012/0040226 A1* | 2/2012 | Kim et al. ................. 429/120 |

FOREIGN PATENT DOCUMENTS

| | | |
|---|---|---|
| CN | 201667355 U | 12/2010 |
| EP | 0-834-952 A2 | 4/1998 |
| EP | 0834952 * | 4/1998 |
| EP | 1-753-058 A2 | 2/2007 |
| EP | 2-450-978 A2 | 5/2012 |
| EP | 2-450-979 A2 | 5/2012 |
| EP | 1 753 058 B1 | 10/2012 |
| JP | 2011-129505 A | 6/2011 |
| JP | 2012-033306 A | 2/2012 |
| KR | 1998-0034148 U | 9/1998 |
| KR | 10-2008-0027506 A | 3/2008 |
| KR | 10-2010-0064819 A | 6/2010 |

OTHER PUBLICATIONS

Chinese Office Action dated Mar. 28, 2016 in corresponding Chinese Patent Application No. 201210149060.0.

Japanese Office Action dated Jun. 13, 2016 in Corresponding Japanese Patent Application No. 2012-202459.

* cited by examiner

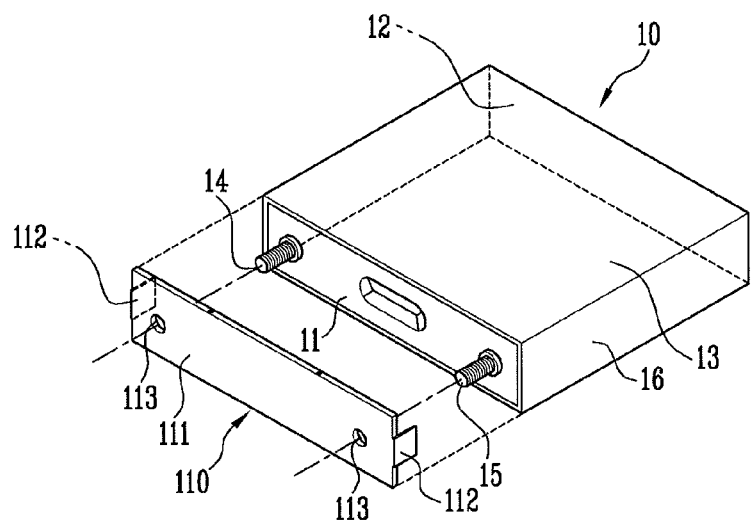
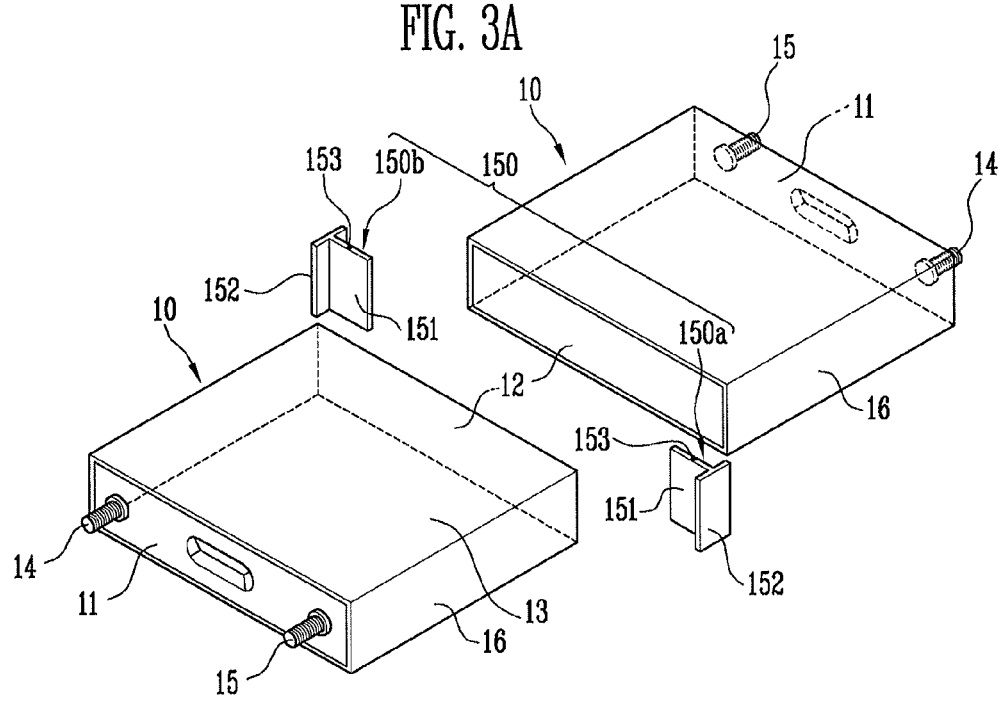

BATTERY MODULE

CROSS-REFERENCE TO RELATED APPLICATION

The present application claims priority under 35 U.S.C. §119(e) to U.S. Provisional Application No. 61/535,001, filed on Sep. 15, 2011, and entitled: "Battery Module," which is incorporated herein by reference in its entirety.

BACKGROUND

1. Field

Embodiments relate to a battery module.

2. Description of the Related Art

Recently, a high-output battery module including batteries using a high-energy density non-aqueous electrolyte has been developed. The high-output battery module may be formed by connecting a plurality of battery cells in series so as to be used for driving a motor or device requiring high power, e.g., an electric car, or the like.

Sizes and/or shapes of devices adopting the battery module may vary greatly, and thus, a size and/or shape of the battery module may also vary. For example, a demand of a light and small-sized battery module has increased.

SUMMARY

Embodiments are directed to a battery module.

The embodiments may be realized by providing a battery module including at least two battery cells, each battery cell including a terminal surface having a terminal therein, a back surface, and a side surface extending in a plane between the terminal surface and the back surface, the back surface of one battery cell facing the back surface of another battery cell such that the at least two battery cells have face-to-face back surfaces; a housing fixing the at least two battery cells together; and a mid-support between the at least two battery cells, the mid-support including at least one base portion in an interposed, adjoining relationship with the face-to-face back surfaces of the battery cells, and at least one flange portion extending in a plane parallel to the plane of the side surface.

The mid-support may be fixedly coupled with the housing.

The mid-support may include a first mid-support and a second mid-support, the first mid-support and the second mid-support each including one base portion and one flange portion, and the base portion of the first mid-support and the base portion of the second mid-support extending toward one another along the face-to-face back surfaces of the battery cells.

Each mid-support may have a roughly T-shape.

The mid-support may include one base portion and a pair of flange portions on ends of the base portion.

The embodiments may also be realized by providing a battery module including a pair of end plates extending in parallel with one another, at least two battery cells, each battery cell including a terminal surface having a terminal therein, a back surface, and a wide surface, the wide surface extending between the terminal surface and the back surface, the back surface of one battery cell facing the back surface of another battery cell such that the at least two battery cells have face-to-face back surfaces, a cover plate covering at least a part of the wide surface of each battery cell, a mid-support in an interposed, adjoining relationship with the face-to-face back surfaces of the battery cells.

The mid-support may include at least one base portion parallel with the end plates, and at least one flange portion disposed orthogonally on at least one end of the at least one base portion.

The mid support may be coupled with at least one of the cover plate and the end plates.

The cover plate may include a top plate and a bottom plate, the top plate and the bottom plate being parallel with one another and with the wide surface.

The mid-support may include a top mid-support fixing recess in a top side of the base portion and a bottom mid-support fixing recess in a bottom side of the base portion, the top plate may include a top mid-support fixing hole, the top mid-support fixing hole corresponding to the top mid-support fixing recess of the mid-support, the bottom plate may include a bottom mid-support fixing hole, the bottom mid-support fixing hole corresponding to the bottom mid-support fixing recess of the mid-support, the top plate may be coupled with the mid-support via a fastener coupled with the top mid-support fixing hole and the top mid-support fixing recess, and the bottom plate may be coupled with the mid-support via a fastener coupled with the bottom mid-support fixing hole and the bottom mid-support fixing recess.

Each of the end plates may include at least one end plate bottom fixing recess and at least one end plate top fixing recess, the bottom plate may include bottom end plate fixing holes, the bottom end plate fixing holes corresponding to the end plate bottom fixing recesses of the end plates, the bottom plate may be coupled with the end plates via fasteners coupled with the bottom end plate fixing holes and the end plate bottom fixing recesses, the top plate may include top end plate fixing holes, the top end plate fixing holes corresponding to the end plate top fixing recesses of the end plates, and the top plate may be coupled with the end plates via fasteners coupled with the top end plate fixing holes and the end plate top fixing recesses.

The mid-support may include a first mid-support and a second mid-support, the first mid-support and the second mid-support each including one base portion and one flange portion, he base portion of the first mid-support and the base portion of the second mid-support may extend toward one another in parallel with the end plates, and the flange portion of the first mid-support and the flange portion of the second mid-support may extend in parallel with one another and perpendicularly with respect to the base portions.

Each end plate may further include fixing tabs at ends thereof, the fixing tabs being bent toward the mid-support to be parallel with at least one flange portion of the mid-support, and each fixing tab may extend along a narrow side surface of each of the battery cells.

The fixing tabs may be coupled with the at least one flange portion of the mid-support.

The mid-support may include one base portion and a pair of flange portions on ends of the base portion.

The base portion may extend in parallel with the end plates, and the flange portions may extend in parallel with one another and perpendicularly to the base portion.

At least one flange portion extends along a narrow side surface of the battery cells.

The at least two battery cells may include at least two sets of cells, each set of cells being stacked in a direction orthogonal to the cover plate.

A height of the end plates and a height of the mid-support may correspond to a height of a set of stacked battery cells.

Each end plate may include at least one terminal hole therethrough, each of the battery cells may include at least one terminal on the terminal surface thereof, and the at least one terminal of each of the battery cells may extend through the at least one terminal hole of a corresponding end plate.

BRIEF DESCRIPTION OF THE DRAWINGS

The embodiments will become apparent to those of ordinary skill in the art by describing in detail exemplary embodiments with reference to the attached drawings, in which:

FIG. 2 illustrates a perspective view of an end plate and a battery cell in the battery module of FIG. 1B.

FIG. 3A illustrates a perspective view of the battery cell and a mid-support of the battery module of FIG. 1B.

DETAILED DESCRIPTION

Figure 1A:
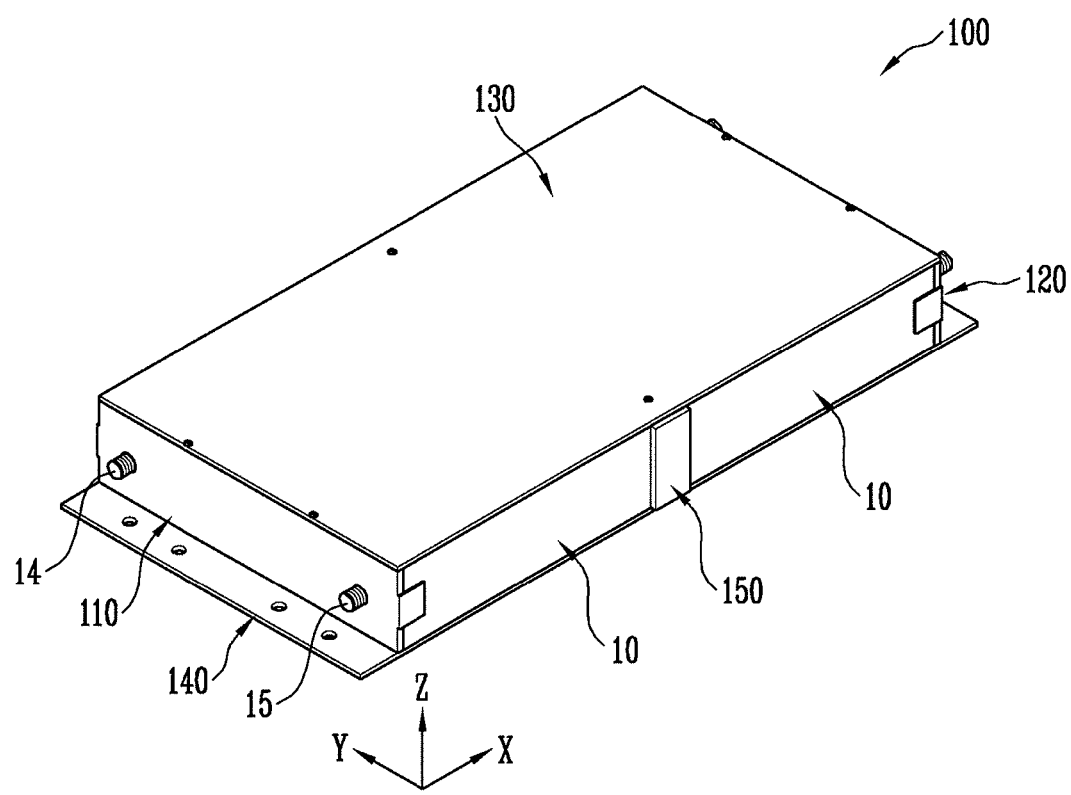
FIG. 1A illustrates a perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

In describing the embodiment, well-known functions or constructions will not be described in detail since they may unnecessarily obscure the understanding of the embodiments.

Figure 1B:
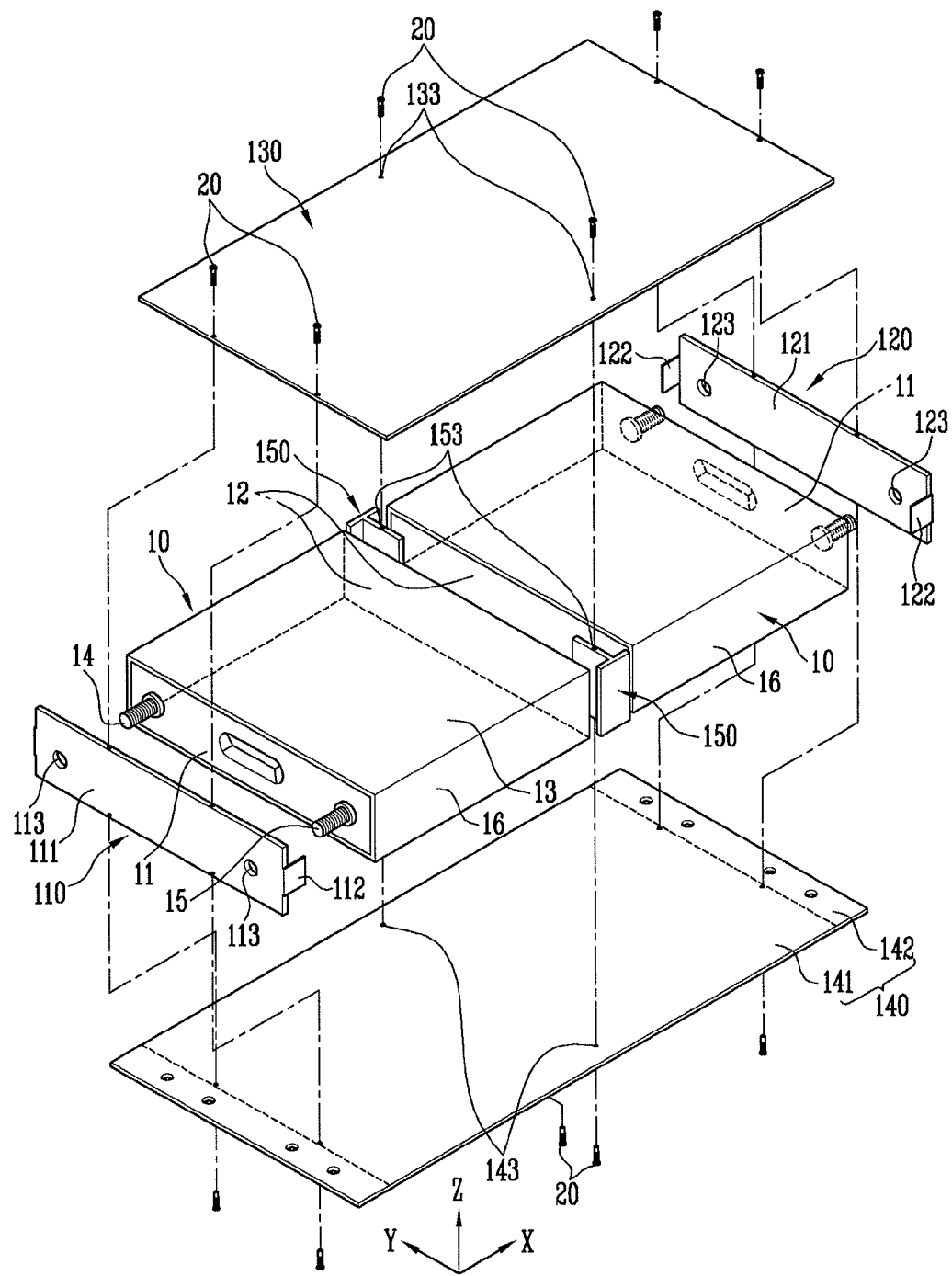
FIG. 1B illustrates an exploded perspective view of the battery module of FIG. 1A.

FIG. 1A illustrates a perspective view of a battery module according to an embodiment. FIG. 1B illustrates an exploded perspective view of the battery module of FIG. 1A.

A battery module 100 according to an embodiment may include at least two battery cells 10 (each including a first or terminal surface 11 including a terminal portion 14 and/or 15 and a second or back surface 12 facing the first surface 11); a mid-support 150 between the at least two battery cells 10; and a housing 110, 120, 130, and 140 receiving the battery cells 10 and the mid-support 150 and fixing the at least two battery cells 10 together. The mid-support 150 may be fixedly coupled with the housing 110, 120, 130, and 140. The battery cell 10 may be arranged such that a wide surface 13 thereof (connecting the terminal surface and the back surface 11 and 12) is parallel with a bottom surface, and the back surfaces 12 of the adjacent battery cells are arranged to face each other with the mid-support 150 interposed between the back surfaces 12 of the battery cell 10. For example the back surface of one of the battery cells 10 may face the back surface 12 of another battery cell 10 such that the at least two battery cells 10 have face-to-face back surfaces 12.

In an implementation, the housing 110, 120, 130, and 140 may include end plates 110 and 120 facing each other and a cover plate. The cover plate may include a bottom plate 140 (connected to the end plates 110 and 120 and parallel with the bottom surface) and/or a top plate 130 facing the bottom plate 140. The top plate 130 and the bottom plate 140 may be parallel with one another and with the wide surface 13 of the battery cell 10.

The bottom plate 140 may include a cell seating portion 141 (having a size corresponding to the top plate 130) and a mounting portion 142 extending therefrom and including holes. The cell seating portion 141 may be seated or coupled with the wide surface 13 of the battery cell 10, and the mounting portion 142 may extend from sides of the cell mounting portion 141 and may include the holes. The holes may facilitate mounting of the battery module 100 on external devices, e.g., a car, or the like, using a bolt, a stud, or the like. The housing 110, 120, 130, and 140 may firmly fix the battery cell 10, may be provided for convenience of use of the battery module 100, and may be variously shaped, e.g., without being limited to the above-mentioned shape.

FIG. 2 illustrates a perspective view of an end plate and a battery cell of the battery module of FIG. 1B.

Referring to FIGS. 1B and 2, the battery cells 10 may be provided between the end plates 110 and 120. For example, the battery cells 10 may be arranged such that terminal surfaces 11 thereof face respective ones of the end plates 110 and 120.

The battery cell 10 may be manufactured by providing an electrode assembly (not illustrated) and an electrolyte (not illustrated) in a battery case (including the back surface 12 and the wide surface 13) and then, sealing the battery case at the terminal surface 11. For example, the terminal surface 11 may include a cap assembly or the like. The terminal surface 11 may be provided with the terminals 14 and 15. The terminals 14 and 15 may include, e.g., a positive terminal 14 and a negative terminal 15, at ends of the terminal surface 11. The electrode assembly may be connected to the positive terminal 14 and the negative terminal 15, and electrochemical energy generated by the battery cell 10 may be transferred outside of the battery cell 10 through the positive terminal 14 and the negative terminal 15.

The end plates 110 and 120 may include flat portions 111 and 121 (facing the terminal surface 11 of the battery cell 10) and fixing tabs 112 and 122 (curved or bent toward the battery cell 10 at sides of the flat portions 111 and 121). The end plates 110 and 120 may include terminal holes 113 and 123 that correspond to the terminals 14 and 15. The end plate 120 according to the present embodiment may correspond to the end plate 110, e.g., may be a mirror-image thereof. Accordingly, the embodiments will be described with respect to the end plate 110.

The flat portion 111 of the end plate 110 may correspond to the terminal surface 11 of the battery cell 10, and the fixing tab 112 may cover a side of the battery cell 10. The flat portion 111 and the fixing tab 112 may firmly fix the battery cell 10 (without using a separate fastener) and thus, a manufacturing process of the battery module 100 may be simplified. In addition, the flat portion 110 may include the terminal hole 113. The terminal hole 113 may expose the terminals 14 and 15 of the battery cell 10 to the outside and thus, may facilitate the electrical connection between the adjacent battery modules 100. In addition, the terminal hole 113 (corresponding to the terminals 14 and 15) may guide or fix a position of the battery cell 10, thereby improving the manufacturing efficiency of the battery module 100.

Figure 3B:
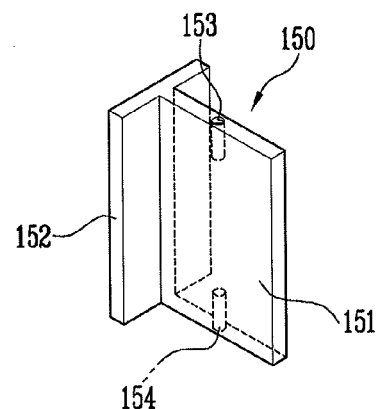
FIG. 3B illustrates an enlarged view of the mid-support of FIG. 3A.

FIG. 3A illustrates a perspective view of a battery cell and a mid-support of the battery module of FIG. 1B. FIG. 3B illustrates an enlarged view of the mid-support of FIG. 3A.

Referring to FIGS. 1B, 3A, and 3B, the battery cell 10 may be arranged such that the wide surface 13 of the battery cell 10 is parallel with the bottom surface, and the back surfaces 12 of the adjacent battery cells 10 face each other. In addition, a mid-support 150 may be interposed between the facing back surfaces 12 of the adjacent battery cells 10.

The mid-support 150 may include at least one base portion 151 (interposed between the battery cells 10) and a flange portion 152 vertically connected to the base portion 151. The base portion 151 may be connected at a center of the flange portion 152. For example the mid-support 150 may include at least one base portion 151 parallel with the end plates 110 and 120 and at least one flange portion 152 disposed orthogonally on at least one end of the at least one base portion 151. In an implementation, the mid-support 150 may include at least one base portion 151 in an interposed, adjoining relationship with the face-to-face back surfaces 12 of the battery cells 10 and at least one flange portion 152 extending in a plane parallel to a plane of a side surface of the battery cells 10.

For example, the mid-support 150 may have a roughly T-shape. The battery module according to the present embodiment may include first and second mid-supports 150a and 150b, and the first and second mid-supports 150a and 150b may be at opposite sides of the battery module. In an implementation, the first mid-support 150a and the second mid-support 150b may each include one base portion 151 and one flange portion 152, and the base portion 151 of the first mid-support 150a and the base portion 151 of the second mid-support 150b may extend toward one another along the face-to-face back surfaces 12 of the battery cells 10. For example, the base portion 151 of the first mid-support 150a and the base portion 151 of the second mid-support 150b may extend toward one another in parallel with the end plates 110 and 120, and the flange portions 152 of the first mid-support 150a and the second mid-support 150b may extend in parallel with one another and perpendicularly with respect to the base portions 151.

The mid support 150 may be coupled with at least one of the cover plate and the end plates 110 and 120. For example, the mid-support 150 may contact the top and bottom plates 130 and 140. A height of the base portion 151 may approximately correspond to a height of the back surface 12 of the battery cell 10. In addition, the mid-support 150 may include mid-support fixing recesses 153 and 154 at a portion contacting the top and bottom plates 130 and 140. The top and bottom plates 130 and 140 may include mid-support fixing holes 133 and 143 that correspond to the mid-support fixing recesses 153 and 154 and thus, the mid-support 150 and the top and bottom plates 130 and 140 may be fastened together with a fastener 20. For example, the fastener 20 may include a bolt, a stud, or the like. The mid-support fixing recesses 153 and 154 and the mid-support fixing holes 133 and 143 may be fastened with the fastener 20 such the mid-support 150 may be firmly fixed to the top and bottom plates 130 and 140. For example, the mid-support 150 may maintain a space between the top and bottom plates 130 and 140 to thereby maintain the shape of the battery module 100.

The flange portion 152 may correspond with a narrow side surface 16 of the adjacent battery cells 10 and may fix the position of the battery cells 10 in the battery module 100. The mid-support 150 may be fixed by mid-support fixing recesses 153 and 154 and the mid-support fixing holes 133 and 143, and the flange portion 152 may surround or extend a long the narrow side surface 16 of the battery cell 10, thereby helping to prevent separation of the side portion of the battery cell 10. The battery module 100 according to the present embodiment may not include a separate member for fixing the side portion of the battery cell 10 by the mid-support 150 and thus, an overall weight of the battery module 100 may be reduced.

Hereinafter, another embodiment will be described with reference to FIGS. 4A and 7.

Except for the following description, the present embodiment is similar to the embodiment described with respect to FIGS. 1 to 3B. Accordingly, a repeated detailed description thereof is omitted.

Figure 4A:
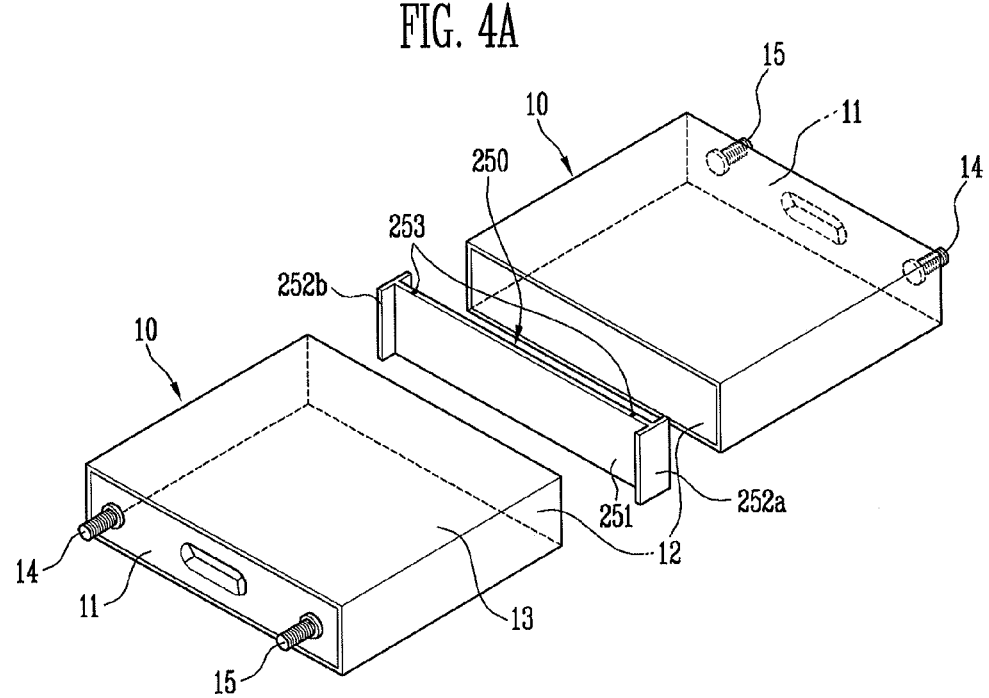
FIG. 4A illustrates a perspective view of a mid-support and a battery cell according another embodiment.
Figure 4B:
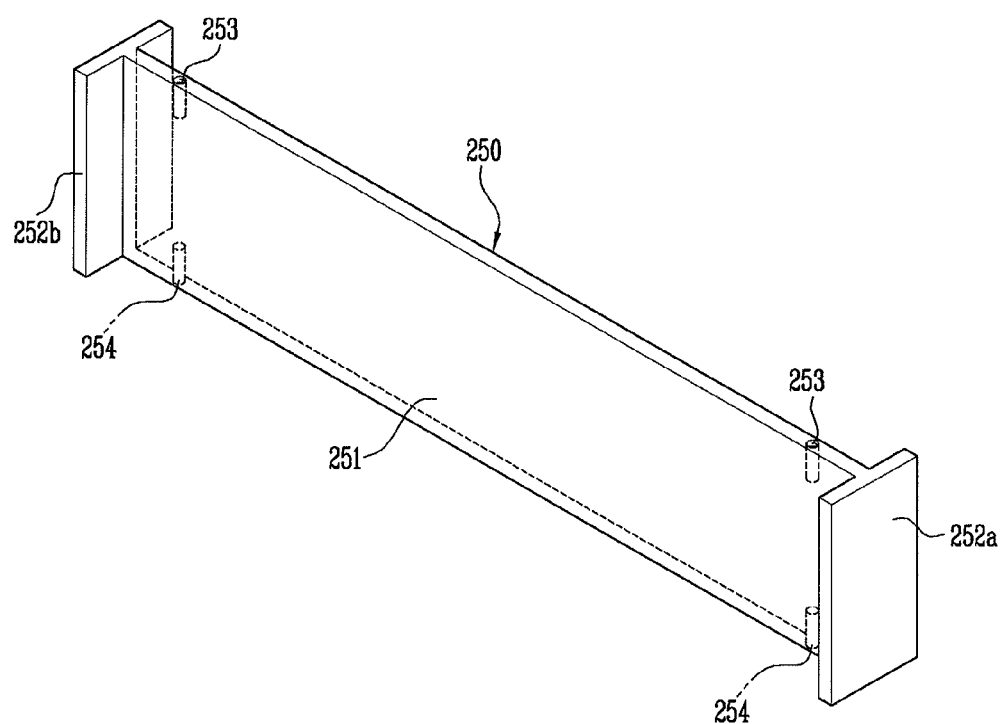
FIG. 4B illustrates an exploded view of the mid-support of FIG. 4A.

FIG. 4A illustrates a perspective view of a mid-support and a battery cell according to another embodiment. FIG. 4B illustrates an enlarged view of the mid-support of FIG. 4A.

Referring to FIGS. 4A and 4B, adjacent battery cells 10 may be arranged so that the backs surfaces 12 thereof face each other and the mid-support 250 is interposed between the back surfaces 12.

The mid-support 250 may include a base portion 251 (facing the back surfaces 12 of the battery cells 10) and first and second flange portions 252a and 252b (connected to respective ends of the base portion 251). For example, the mid-support 250 may include one base portion 251 and a pair of flange portions 252 on ends of the base portion 251. In an implementation, the base portion 251 may extend in parallel with end plates and the flange portions 252 may extend in parallel with one another and perpendicularly to the base portion 251.

A size of the base portion 251 may correspond to a size of the back surface 12 of the battery cell 10. The battery cell 10 may be inserted into a space formed by the base portion 251 and the first and second flange portions 252a and 252b such that the battery cell 10 may be easily arranged. In addition, side portions of the battery cell 10 may be fixed without a separate member, thereby improving stability of the battery module 100. The mid-support 250 may further include mid-support fixing recesses 253 and 254 for coupling the mid-support with the top and bottom plates. Thus, a fixing force of the battery module may be improved.

Figure 5:
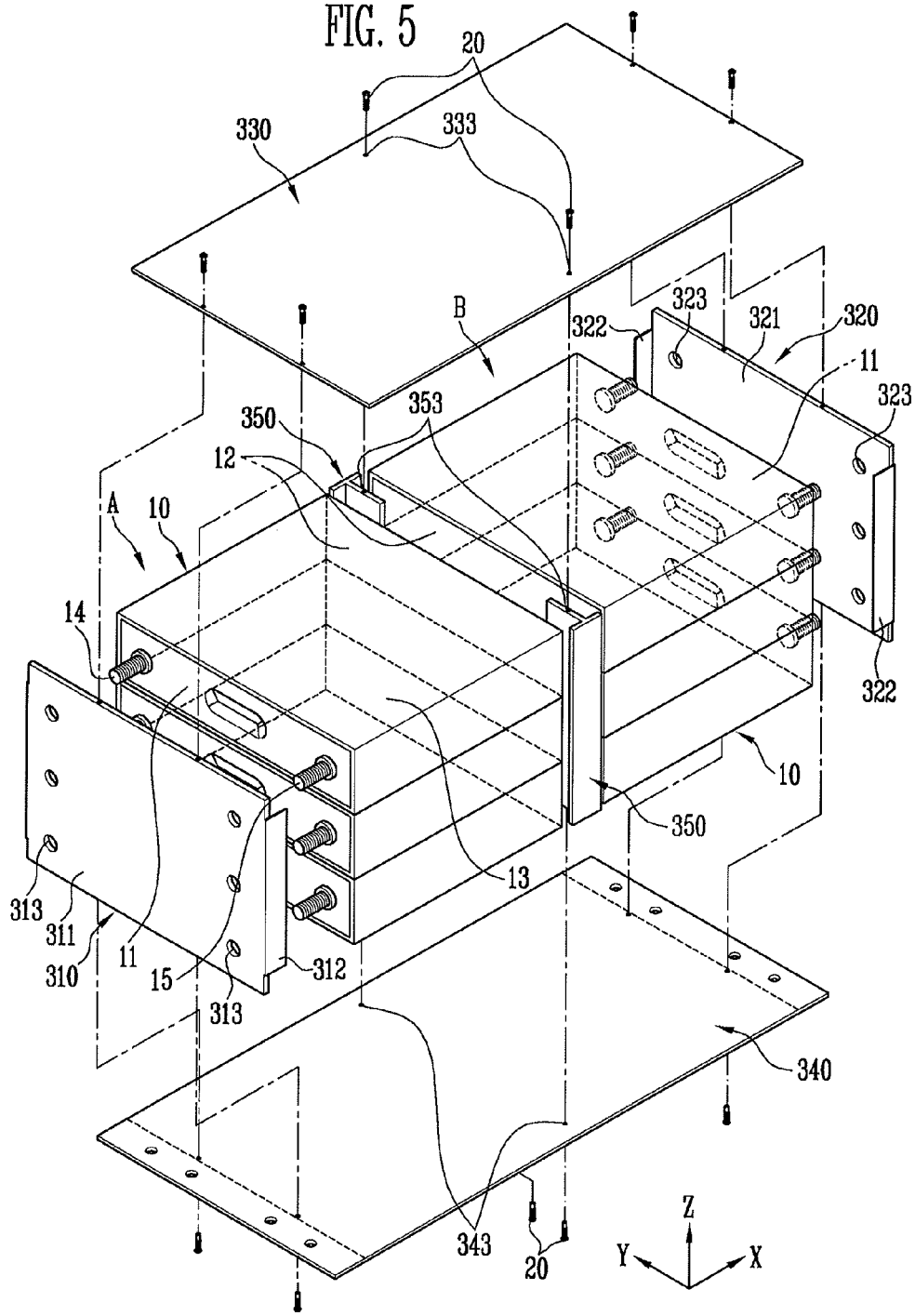
FIG. 5 illustrates an exploded perspective view of a battery module according to another embodiment.
Figure 6:
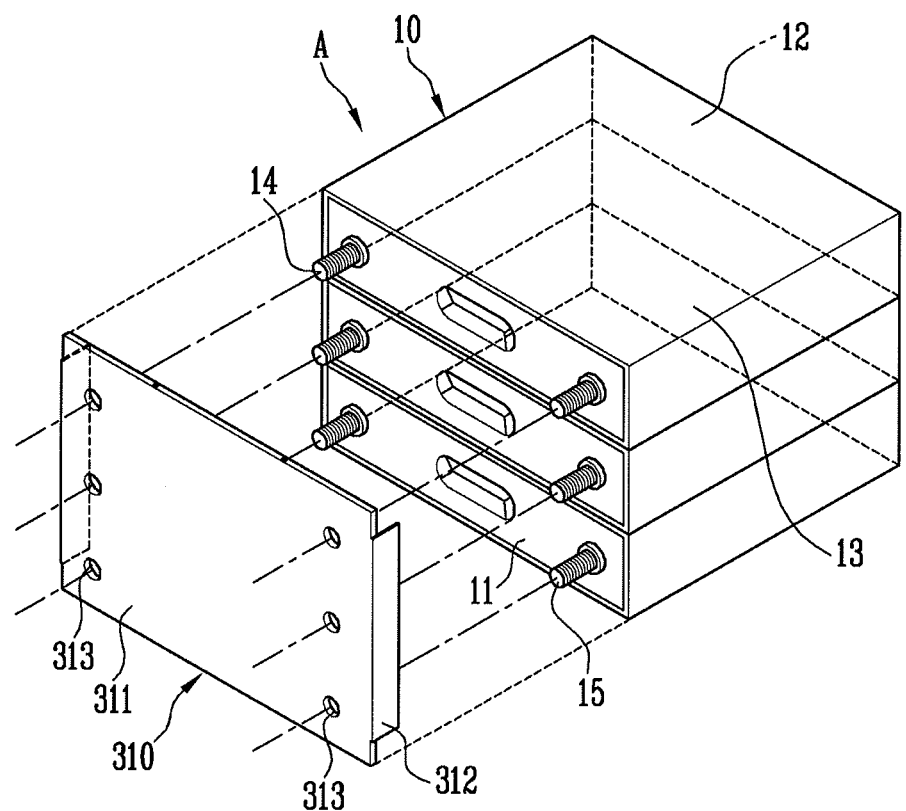
FIG. 6 illustrates a perspective view of an end plate and a cell array of the battery module of FIG. 5.

FIG. 5 illustrates an exploded perspective view of a battery module according to yet another embodiment. FIG. 6 illustrates a perspective view of an end plate and a cell array of the battery module of FIG. 5.

Referring to FIGS. 5 and 6, the battery module according to the present embodiment may include cell arrays A and B that are stacked such that the wide surfaces 13 of the plurality of battery cells 10 face each other. The cell arrays A and B includes a first cell array A and a second array B, and the first and second cell arrays A and B may be arranged such that the back surfaces 12 of the battery cells 10 face each other. In addition, a mid-support 350 may be interposed between the first and second cell arrays A and B, and a position of the cell arrays A and B and the mid-support 350 may be fixed by a housing 310, 320, 330, and 340.

The battery cells 10 may be stacked on a bottom plate 340 of the housing in one direction to form the first and second cell arrays A and B. The first and second cell arrays A and B may be stacked such that the approximately same number of battery cells 10 are stacked, thereby ensuring that a height of each of the stacks corresponds to each other. In this case, the battery cell 10 may be stacked so that a terminal surface 10 of the battery cell 10 faces the end plate 310. For example, the at least two battery cells 10 may include at least two sets of cells 10, each set of cells 10 being stacked in a direction orthogonal to the cover plate.

The end plate 310 may have a size corresponding to the first cell array A (so as to surround the first cell array A), and the end plate 320 may have a size corresponding to the second cell array B (so as to surround the second array B). The first and second cell arrays A and B may have corresponding heights and thus, the end plates 310 and 320 may have corresponding sizes. The end plates 310 and 320 may include flat parts 311 and 321 and fixing tabs 312 and 322 curved or bent from the first and second flat portions 311 and 321. The flat portions 311 and 321 of the end plates 310 and 320 may further include terminal holes 313 and 323. Hereinafter, the end plate 310 will be mainly described. Although not separately described, the end plate 320 may have a shape corresponding to the end plate 310, e.g., the end plate 320 may be a mirror image of the end plate 310.

Referring to FIG. 6, the terminals 14 and 15 of the battery cells 10 forming the first cell array A may be inserted into the terminal hole 313 of the end plate 310 so as to be exposed to the outside.

In a typical battery module including the cell array formed by stacking the plurality of battery cells, the arrangement between the battery cells may not be facilitated, which may be a cause of defects of the battery module. In the battery module according to the present embodiment, a position of the cell arrays may be guided by insertion of the terminals 14 and 15 through the terminal hole 313. Thus, an arrangement of the battery cells may be easily implemented, thereby improving productivity.

Figure 7:
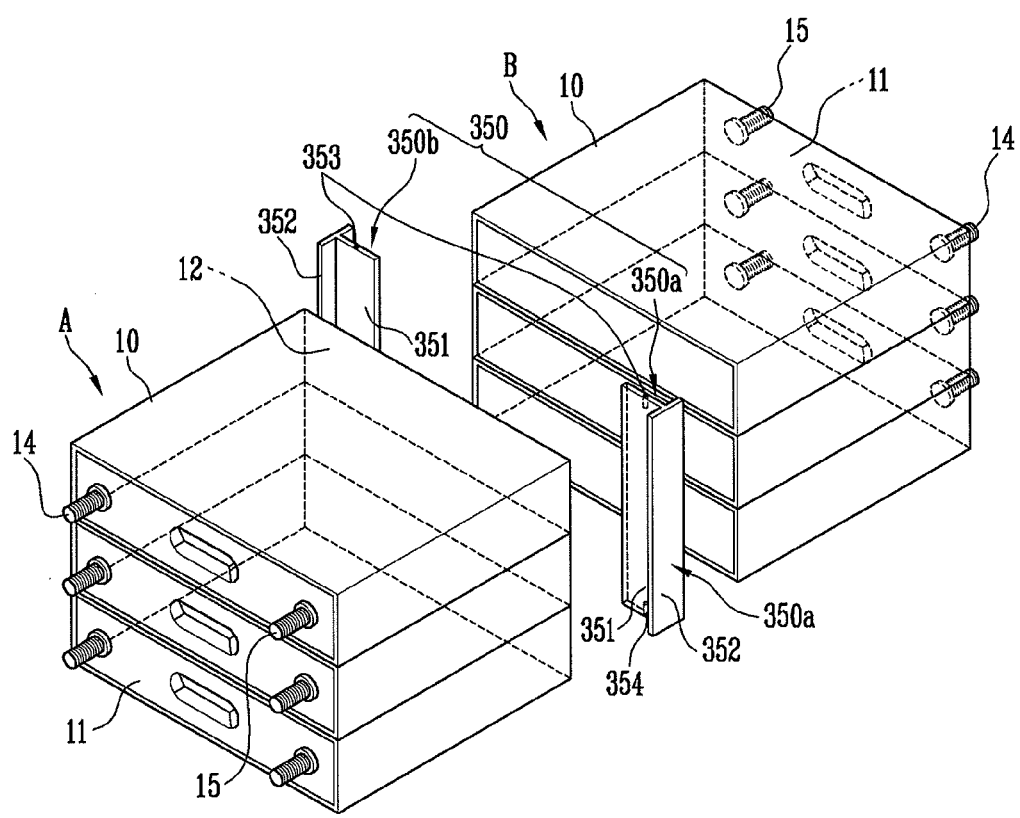
FIG. 7 illustrates a perspective view of the cell array and a mid-support of the battery module of FIG. 5.

FIG. 7 illustrates a perspective view of a cell array and a mid-support of the battery module of FIG. 5.

Referring to FIGS. 5 and 7, the mid-supports 350 (e.g., 350a and 350b) may include a base portion 351 (interposed between the first and second cell arrays A and B) and a flange portion 352 vertically connected to the base portion 351. The base portion 351 and the flange portion 352 may correspond to the first and second cell arrays A and B and may fix the first and second cell arrays A and B together with the end plates 310 and 320. For example, a height of the end plates 310 and 320 and a height of the mid-support 350 may correspond to a height of a set of stacked battery cells 10.

The mid-support 350 may contact the top and bottom plates 330 and 340 and mid-support fixing recesses 353 and 354 may be provided at a portion where the mid-support 350 contacts the top plate 330 or bottom plate 340. The top and bottom plates 330 and 340 may include mid-support fixing holes 333 and 343 (corresponding to the mid-support fixing recesses 353 and 354) so that the mid-support 350 and the top and bottom plates 330 and 340 may be fastened together by a fastener 20. In an implementation, the mid-support 350 may include a top mid-support fixing recess 353 in a top side of the base portion 351 and a bottom mid-support fixing recess 354 in a bottom side of the base portion 351. The top plate 330 may include a top mid-support fixing hole 333 corresponding to the top mid-support fixing recess 353 of the mid-support 350. The bottom plate 340 may include a bottom mid-support fixing hole 343 corresponding to the bottom mid-support fixing recess 354 of the mid-support 350. The top plate 330 may be coupled with the mid-support 350 via a fastener 20 coupled with the top mid-support fixing hole 333 and the top mid-support fixing recess 353. The bottom plate 340 may be coupled with the mid-support 350 via a fastener 20 coupled with the bottom mid-support fixing hole 343 and the bottom mid-support fixing recess 354. Each end plate 310 and 320 may include at least one end plate bottom fixing recess and at least one end plate top fixing recess. The bottom plate 340 may include bottom end plate fixing holes corresponding to the end plate bottom fixing recesses of the end plates 310 and 320. The bottom plate 340 may be coupled with the end plates 310 and 320 via fasteners 20 coupled with the bottom end plate fixing holes and the end plate bottom fixing recesses. The top plate 330 may include top end plate fixing holes corresponding to the end plate top fixing recesses of the end plates 310 and 320. The top plate 330 may be coupled with the end plates 310 and 320 via fasteners 20 coupled with the top end plate fixing holes and the end plate top fixing recesses.

Figure 8:
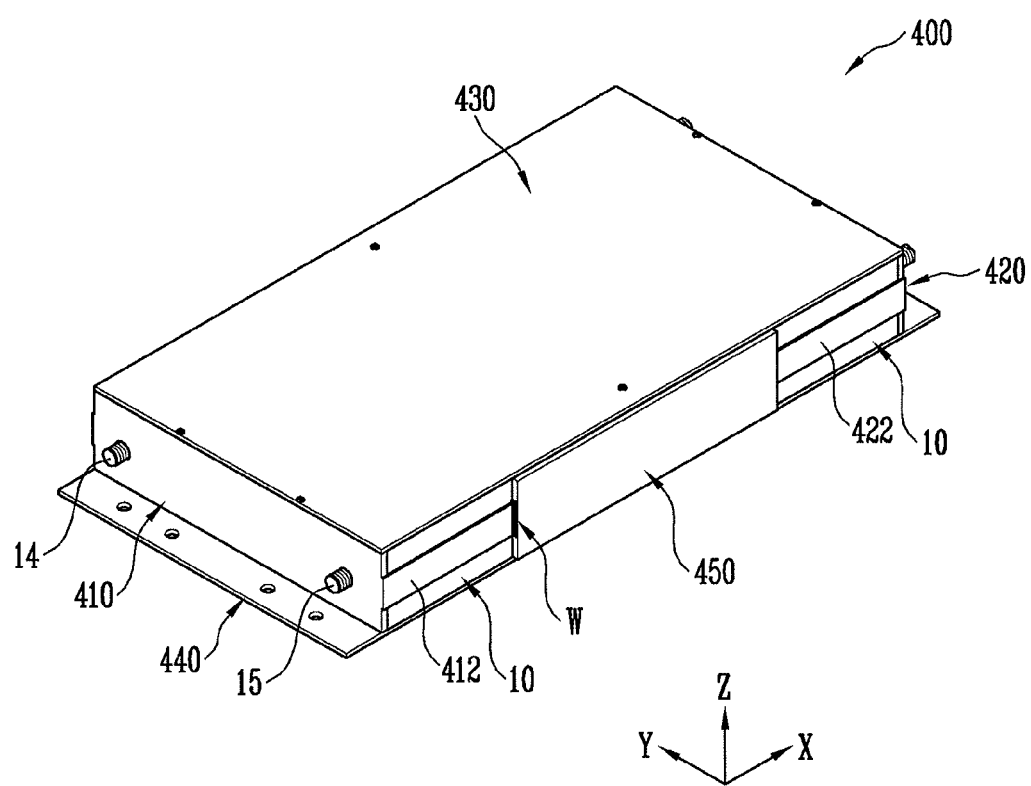
FIG. 8 illustrates a perspective view of a battery module according to yet another embodiment.

FIG. 8 illustrates a perspective view of a battery module according to yet another embodiment. Repeated descriptions of elements similar or identical to those of the above-described embodiments are omitted.

In FIG. 8, a battery module 400 may include at least two battery cells 10, a mid-support 450, and a housing 410, 420, 430, and 440. The housing may include end plates 410 and 420, a top plate 430, and a bottom plate 440. Terminals 14 and 15 of the battery cells 10 may protrude through the end plates 410 and 420 to be exposed outside of the battery module 400. The mid-support 450 may include a two-piece mid-support or a one-piece mid-support, as described above with respect to other embodiments. In the present embodiment, the end plates 410 and 420 may include fixing tabs 412, 422 extending along sides of the battery cells 10. The fixing tabs 412, 422 may extend along the sides of the battery cells to meet a flange portion of the mid-support 450. The fixing tabs 412, 422 of the end plates 410 and 420 may be coupled with the mid-support by, e.g., welding. For example, a weld W may be formed where the fixing tabs 412, 422 are coupled with the mid-support 450.

The embodiments provide a battery module having a new structure and being capable of improving stability by firmly fixing a battery cell.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
    at least two battery cells, each battery cell including a terminal surface having a terminal therein, a back surface, and a planar narrow side surface extending in a plane between the terminal surface and the back surface, the back surface of one battery cell facing the back surface of another battery cell such that the at least two battery cells have face-to-face back surfaces;

a housing fixing the at least two battery cells together; and
a mid-support between the at least two battery cells, the mid-support including:
at least one base portion in an interposed, adjoining relationship with the face-to-face back surfaces of the battery cells, and
at least one flange portion extending in a plane parallel to the plane of the planar narrow side surface, the at least one flange portion extending along and coplanar with the planar narrow side surface of each battery cell,
the housing including a pair of end plates, each end plate including:
fixing tabs at ends thereof, the fixing tabs being bent toward the mid-support to be parallel with at least one flange portion of the mid-support, each fixing tab extending along a narrow side surface of each of the battery cells, the fixing tabs being directly coupled with the at least one flange portion of the mid-support, and
at least one terminal hole therethrough,
each of the battery cells including at least one terminal on the terminal surface thereof, and
the at least one terminal of each of the battery cells extending through the at least one terminal hole of a corresponding end plate.

2. The battery module as claimed in claim 1, wherein the mid-support is fixedly coupled with the housing.

3. The battery module as claimed in claim 1, wherein the mid-support includes a first mid-support and a second mid-support, the first mid-support and the second mid-support each including one base portion and one flange portion, and the base portion of the first mid-support and the base portion of the second mid-support extending toward one another along the face-to-face back surfaces of the battery cells.

4. The battery module as claimed in claim 3, wherein each mid-support has a roughly T-shape.

5. The battery module as claimed in claim 1, wherein the mid-support includes one base portion and a pair of flange portions on ends of the base portion.

6. A battery module, comprising:
a pair of end plates extending in parallel with one another,
at least two battery cells, each battery cell including a terminal surface having a terminal therein, a back surface, a planar narrow side surface, and a wide surface, the narrow side surface and the wide surface each extending between the terminal surface and the back surface, the back surface of one battery cell facing the back surface of another battery cell such that the at least two battery cells have face-to-face back surfaces,
a cover plate covering at least a part of the wide surface of each battery cell, and
a mid-support in an interposed, adjoining relationship with the face-to-face back surfaces of the battery cells, wherein:
the mid-support includes at least one flange portion that extends along and is coplanar with the planar narrow side surface of each battery cell,
each end plate includes:
fixing tabs at ends thereof, the fixing tabs being bent toward the mid-support to be parallel with at least one flange portion of the mid-support, each fixing tab extending along a narrow side surface of each of the battery cells, the fixing tabs being directly coupled with the at least one flange portion of the mid-support, and
at least one terminal hole therethrough,
each of the battery cells includes at least one terminal on the terminal surface thereof, and
the at least one terminal of each of the battery cells extends through the at least one terminal hole of a corresponding end plate.

7. The battery module as claimed in claim 6, wherein the mid-support includes:
at least one base portion parallel with the end plates, and
at least one flange portion disposed orthogonally on at least one end of the at least one base portion.

8. The battery module as claimed in claim 6, wherein the mid support is coupled with at least one of the cover plate and the end plates.

9. The battery module as claimed in claim 8, wherein the cover plate includes a top plate and a bottom plate, the top plate and the bottom plate being parallel with one another and with the wide surface.

10. The battery module as claimed in claim 9, wherein:
the mid-support includes a top mid-support fixing recess in a top side of the base portion and a bottom mid-support fixing recess in a bottom side of the base portion,
the top plate includes a top mid-support fixing hole, the top mid-support fixing hole corresponding to the top mid-support fixing recess of the mid-support,
the bottom plate includes a bottom mid-support fixing hole, the bottom mid-support fixing hole corresponding to the bottom mid-support fixing recess of the mid-support,
the top plate is coupled with the mid-support via a fastener coupled with the top mid-support fixing hole and the top mid-support fixing recess, and
the bottom plate is coupled with the mid-support via a fastener coupled with the bottom mid-support fixing hole and the bottom mid-support fixing recess.

11. The battery module as claimed in claim 9, wherein:
each of the end plates includes at least one end plate bottom fixing recess and at least one end plate top fixing recess,
the bottom plate includes bottom end plate fixing holes, the bottom end plate fixing holes corresponding to the end plate bottom fixing recesses of the end plates,
the bottom plate is coupled with the end plates via fasteners coupled with the bottom end plate fixing holes and the end plate bottom fixing recesses,
the top plate includes top end plate fixing holes, the top end plate fixing holes corresponding to the end plate top fixing recesses of the end plates, and
the top plate is coupled with the end plates via fasteners coupled with the top end plate fixing holes and the end plate top fixing recesses.

12. The battery module as claimed in claim 6, wherein:
the mid-support includes a first mid-support and a second mid-support, the first mid-support and the second mid-support each including one base portion and one flange portion,
the base portion of the first mid-support and the base portion of the second mid-support extend toward one another in parallel with the end plates, and
the flange portion of the first mid-support and the flange portion of the second mid-support extend in parallel with one another and perpendicularly with respect to the base portions.

13. The battery module as claimed in claim 6, wherein the mid-support includes one base portion and a pair of flange portions on ends of the base portion.

14. The battery module as claimed in claim 13, wherein:
the base portion extends in parallel with the end plates, and
the flange portions extend in parallel with one another and perpendicularly to the base portion.

15. The battery module as claimed in claim 6, wherein the at least two battery cells include at least two sets of cells, each set of cells being stacked in a direction orthogonal to the cover plate.

16. The battery module as claimed in claim 15, wherein a height of the end plates and a height of the mid-support correspond to a height of a set of stacked battery cells.

* * * * *